(12) United States Patent
Sautreuil et al.

US011220460B2

(10) Patent No.: US 11,220,460 B2
(45) Date of Patent: Jan. 11, 2022

(54) MULTI-COMPONENT MORTAR SYSTEM

(71) Applicant: SIKA TECHNOLOGY AG, Baar (CH)

(72) Inventors: Dorine Sautreuil, Gonneville la Mallet (FR); Maxime Liard, Saint-Louis (FR); Olivier Herr, Neuf-Marché (FR); Mohamed Cader, Cranford, NJ (US); Didier Lootens, Küssnacht (CH); Anne-Claire Legrain, Hoboken, NJ (US)

(73) Assignee: SIKA TECHNOLOGY AG, Baar (CH)

( * ) Notice: Subject to any disclaimer, the term of this patent is extended or adjusted under 35 U.S.C. 154(b) by 434 days.

(21) Appl. No.: 16/346,712

(22) PCT Filed: Oct. 26, 2017

(86) PCT No.: PCT/EP2017/077516
§ 371 (c)(1),
(2) Date: May 1, 2019

(87) PCT Pub. No.: WO2018/083010
PCT Pub. Date: May 11, 2018

(65) Prior Publication Data
US 2019/0276364 A1  Sep. 12, 2019

(30) Foreign Application Priority Data
Nov. 1, 2016 (EP) .................................. 16196754

(51) Int. Cl.
| | |
|---|---|
| *C04B 28/06* | (2006.01) |
| *C04B 14/06* | (2006.01) |
| *C04B 14/28* | (2006.01) |
| *C04B 22/06* | (2006.01) |
| *C04B 22/14* | (2006.01) |
| *C04B 22/16* | (2006.01) |
| *C04B 40/06* | (2006.01) |
| *B33Y 70/00* | (2020.01) |
| *B29C 64/00* | (2017.01) |
| *B29C 64/10* | (2017.01) |
| *B29C 64/124* | (2017.01) |
| *C04B 103/12* | (2006.01) |
| *C04B 103/22* | (2006.01) |
| *C04B 111/00* | (2006.01) |
| *B33Y 10/00* | (2015.01) |
| *B28B 1/00* | (2006.01) |
| *B29C 71/00* | (2006.01) |
| *B33Y 40/10* | (2020.01) |

(52) U.S. Cl.
CPC ............. *C04B 28/06* (2013.01); *B28B 1/001* (2013.01); *B29C 64/00* (2017.08); *B29C 64/10* (2017.08); *B29C 64/124* (2017.08); *B29C 71/00* (2013.01); *B33Y 40/10* (2020.01); *B33Y 70/00* (2014.12); *C04B 14/06* (2013.01); *C04B 14/28* (2013.01); *C04B 22/062* (2013.01); *C04B 22/147* (2013.01); *C04B 22/165* (2013.01); *C04B 40/065* (2013.01); *C04B 40/0625* (2013.01); *B33Y 10/00* (2014.12); *C04B 2103/12* (2013.01); *C04B 2103/22* (2013.01); *C04B 2111/00181* (2013.01); *Y02W 30/91* (2015.05)

(58) Field of Classification Search
None
See application file for complete search history.

(56) References Cited

U.S. PATENT DOCUMENTS

| | | |
|---|---|---|
| 2010/0175589 A1 | 7/2010 | Charpentier et al. |
| 2014/0343194 A1 | 11/2014 | Taquet et al. |

FOREIGN PATENT DOCUMENTS

| | | |
|---|---|---|
| CN | 105384416 A | 3/2016 |
| EP | 2 431 341 A1 | 3/2012 |
| EP | 2 679 560 A2 | 1/2014 |
| WO | 2013/004621 A1 | 1/2013 |

OTHER PUBLICATIONS

Feb. 19, 2020 Office Action issued in European Patent Application No. 17791379.5.
Le, T. T. et al., "Mix Design and Fresh Properties for High-Performance Printing Concrete", Materials and Structures, (2012), vol. 45, pp. 1221-1232.
Maier, Anne-Kathrin et al., "Three-Dimensional Printing of Flash-Setting Calcium Aluminate Cement", J Mater Sci, (2011), vol. 46, pp. 2947-2954.
Database WPI 1-16, Week 201649, Thomson Scientific, London, GB; AN 2016-16332S, XP002768092.
Dec. 1, 2017 Search Report issued in International Patent Application No. PCT/EP2017/077516.
Dec. 1, 2017 Written Opinion issued in International Patent Application No. PCT/EP2017/077516.
Apr. 7, 2020 Office Action issued in Russian Patent Application No. 2019110305/03(019854).
Apr. 1, 2020 Written Opinion issued in Singapore Patent Application No. 11201903181U.

*Primary Examiner* — Matthew J Daniels
*Assistant Examiner* — Paul Spiel
(74) *Attorney, Agent, or Firm* — Oliff PLC

(57) ABSTRACT

A multi-component mortar system including a component A and a component B wherein, component A includes aluminous cement, at least one set inhibitor, at least one mineral filler and water, and component B includes an initiator system for the set-inhibited aluminous cement, at least one mineral filler and water. The multi-component mortar system is easy to use and suitable for repair and refurbishment and particularly for printing 3D structures.

9 Claims, No Drawings

MULTI-COMPONENT MORTAR SYSTEM

TECHNICAL FIELD

The invention relates to a multi-component mortar system and its use for repair and refurbishment and for printing 3D structures.

BACKGROUND OF THE INVENTION

Two component mortar systems are usually composed of a powder component containing cement and optionally other powdery additives and a liquid component containing water and optionally other liquid additives. These systems suffer from the disadvantage that by mixing the components, the cement in the powder component can form a corrosive dust, polluting the surroundings and leading to health problems when inhaled. Moreover, powder dosing is much more complicated in automated systems than dosing of a liquid material and the powder often leads to a blockage when the mortar is mixed by a static mixer.

These problems can be solved by using a liquid component containing cement in form of a suspension. The most common liquid for suspending cement is water. However, when cement is in contact with water hydration starts leading to setting and hardening of the cement. Hardening of cement can be retarded by using well-known retarders. However, the retardation of Portland cement does not last for days, months or years. Thus, the cement containing component of such an aqueous two-component mortar system cannot be stored long enough for practical use. Use of organic solvents instead of water is not practicable, as most organic solvents are either inflammable and/or unhealthy, will contribute to the greenhouse-effect or remain in the mortar causing further problems.

In contrast to Portland cement, the hydration of aluminous cement can be inhibited for several months or even years. US 2010/0175589 describes the use of boric acid or salts of boric acid as inhibitors of the setting of the aluminous cement. US 2014/0343194 describes the use of phosphate containing set inhibitors for this purpose. These described set-inhibited aluminous cement suspensions have good storage stability. The hydration of such set-inhibited aluminous cement suspensions can be initiated by pH increase. But these systems have disadvantages. The described aluminous cement suspensions contain high amounts of calcium aluminate which causes high costs and leads to high amounts of hydroxide and accelerator needed to initiate the setting, which further increases costs and enhances the corrosiveness of the system.

Thus, from economic, environmental and practical point of view, the existing solutions for mortars based on set-inhibited aluminous cement need improvement.

3D printing is a widely used technique to create three-dimensional (3D) structures for various purposes. In 3D printing, 3D objects are produced by applying layers of material that are positioned under computer control. The material is extruded in formable, viscous state through a nozzle and hardens quickly after deposition. Commonly used materials are thermoplastic polymers. 3D printing of inorganic material is more challenging than printing of polymers. Some attempts with 3D printing of cement based materials are also known, using Portland cement in form of a powder-component with the already described disadvantages.

When state of the art mortars are mixed and applied, the fresh mortar delivered out of the nozzle typically doesn't immediately show the required yield stress to give a good, self-supporting material. Thus, the structure that is intended to be formed must be supported until the setting starts and the mortar develops enough strength to be self-supporting. This, however, needs additional production steps and is associated with increased costs and time. And strongly accelerated state of the art mortars are difficult to control, they can start to stiffen or harden before they are applied, which can lead to blocking of the pumps or the nozzle.

SUMMARY OF THE INVENTION

It is therefore task of the present invention to provide a cost efficient and safe multi-component mortar system with improved durability of the formed structures, which is suitable for repair and refurbishment and particularly for printing 3D structures.

It was surprisingly found that this task can be fulfilled by a multi-component mortar system comprising a component A and a component B wherein component A comprises aluminous cement, at least one set inhibitor, at least one mineral filler and water, and component B comprises an initiator system for the set inhibited aluminous cement, at least one mineral filler and water.

The component A of the mortar system containing aluminous cement is a liquid or paste-like component. This allows a safe handling without causing dust. The components of the multi-component mortar system can be stored for months or even years without significant influence on the production and performance qualities of the fresh and the hardened mortar produced from it.

Surprisingly, the mortar system enables a set mortar in form of a hardened body of high strength and high durability at very low aluminous cement content and at low content of alkaline compounds in the initiator system. This is advantageous with respect to costs and durability of the mortar and to health of the people working with the mortar system, as a high content of alkaline compounds typically leads to a high corrosiveness of component B and of the mortar.

Preferred mortar systems with an unusually low amount of aluminous cement and an optimized filler system show a surprisingly low shrinkage and a reduced porosity when compared to state of the art systems, which is highly desirable.

Preferred mortar systems which are free of boric acid or salts thereof are of particularly low toxicity.

The multi-component mortar system of the present invention is particularly suitable for repair and refurbishment. With the components A and B both ready for mixing, it is particularly easy to use and perfectly suited for the do-it-yourself market.

Surprisingly, the multi-component mortar system of the present invention is particularly suitable for printing 3D structures, enabling a self-supporting structure immediately after mixing the components, and hardening to a high strength mortar within a short period of time. This system is the first inorganic material that can be printed directly from liquid or paste-like, ready-to-use components to form 3D structures in a very easy way without long waiting times between layers applied on top or by the side of already applied layers. Its rheological properties being self-supporting without sagging and its fast buildup of strength enable excellent performance when used for 3D applications with a robotic system.

Further aspects of the invention are subject of further independent claims. Specially preferred embodiments are subject of the dependent claims.

DETAILED DESCRIPTION OF THE INVENTION

Subject of the invention is a multi-component mortar system comprising a component A and a component B wherein
component A comprises aluminous cement, at least one set inhibitor, at least one mineral filler and water, and
component B comprises an initiator system for the set-inhibited aluminous cement, at least one mineral filler and water.

In the present document the term "mortar" means an aqueous dispersion comprising at least one cement and at least one additional mineral filler, which is able to form a hardened body after the hydration reaction of the cement, as well as the hardened body itself.

The term "multi-component mortar system" refers to a system consisting of two or more components, which are all storage stable when stored in separate containers and form a fresh mortar when mixed, which forms a hardened body with a three-dimensional (3D) structure upon setting.

The term "fresh mortar" refers to a mortar obtained by mixing the components of the multi component mortar system immediately after mixing.

The term "self-supporting" refers to a mortar that keeps its structure directly after placing or extrusion within about 10% of the original dimension in all directions, as long as no external force is applied. Thus, when the mortar is extruded as a bead of 10 mm width and 10 mm height, the hardened mortar bead has a height of 9 to 10 mm and a width of 10 to 11 mm.

The term "aluminous cement" refers to a cement with an alumina concentration in the range of 30 to 80 weight-%.

"Set inhibitor" refers to a component or mixture of components that is able to inhibit the reaction of cement with water for many days up to months or even years if used in appropriate dosage. Thus, the "set inhibitor" is also called "blocking agent for the setting". The action of the "set inhibitor" in the scope of this invention must be able to be eliminated by the use of an "initiator system". A "retarder" is a component usually used to prolong the workability time of a wet mortar or concrete before it sets. The effect of a retarder usually lasts for some hours and not for days.

A cement composition containing a set inhibitor is therefore also named as "set-inhibited cement".

The term "set-inhibited aluminous cement" is understood as a mixture of aluminous cement with a set inhibitor as part of component A of the multi-component mortar system of the present invention.

The term "initiator system for the set-inhibited aluminous cement" refers to a component or mixture of components that is able to compensate the inhibitory effect of the set inhibitor if used in appropriate dosage, so that the aluminous cement can set within short time after the initiator system is mixed with the set-inhibited aluminous cement.

The term "accelerator for the hydration reaction" refers to a component or mixture of components that accelerates the hydration reaction of the aluminous cement with water as soon as it has started. Preferably, within the context of this document, the accelerator is not used to overcome the set inhibitory effect of the set inhibitor. However, some components or mixtures of components can act in both ways, as initiator for the set-inhibited aluminous cement and as accelerator for the hydration reaction. Preferably, the initiator and the accelerator are two different components.

The term "mineral filler" refers to a powdery or small sized inorganic material different from cement with a size usually of below 1 mm.

Component A of the multi component mortar system comprises aluminous cement, also known as high-alumina cement or calcium aluminate cement. The setting of calcium aluminate cement can be inhibited for days, months and even years with a suitable set inhibitor and the inhibition can be overcome by an initiator system so that the aluminous cement eventually hardens within short time. This in contrast to Portland cement and calcium sulfoaluminate cement which either cannot be stored as aqueous suspensions for long time without setting or cannot be re-activated by an initiator system.

Suitable aluminous cements are commercially available, for example from Kerneos, France, under the tradenames Ternal®, for example Ternal® White or Ternal® RG; or Secar®, for example Secar® 51; or Ciment Fondu®.

The amount of aluminous cement in component A is preferably in the range of 10 to 50 weight-%, more preferably 10 to 40 weight-%, even more preferably 10 to 25 weight-% and most preferably 10 to below 20 weight-%. A low amount of aluminous cement is preferred from cost point of view and enables a low amount of set inhibitors and a low amount of initiators, which enables a hardened mortar of high durability.

Component A contains at least one set inhibitor for aluminous cement. Aluminous cement reacts with water in a complex hydration reaction forming calcium aluminate hydrates. This reaction of the cement with water forming a hardened body is called setting of the cement. The set inhibitor inhibits this setting reaction of the aluminous cement in component A so that component A can be stored as aqueous suspension for many days or months or even years without stiffening or hardening of the aluminous cement such enabling a good storage stability of the component A.

The set inhibitor is preferably selected from phosphorous compounds such as phosphoric acid, metaphosphoric acid, phosphorous acid, phosphonic acids, aminoalkyl phosphonic acids and phosphono alkyl carboxylic acids; or from boric acid or a salt of boric acid, or mixtures thereof. Optionally, the set inhibitor may further contain additional compounds such as carboxylic acids, hydroxy carboxylic acids or amino acids.

Acidic set inhibitors can reduce the pH of component A which additionally increases the storage stability of component A. Preferably, the pH of the freshly prepared component A is 4 to 8, more preferred 5 to 7.5, even more preferred 6 to 7. This enables a good storage stability of component A.

In a preferred embodiment of the invention the component A is free of boric acid or a salt thereof. This is highly advantageous, as boric acid and salts thereof are quite toxic.

In a preferred embodiment of the invention the component A comprises at least a phosphate-based set inhibitor. The phosphate-based set inhibitor provides an excellent long term stability of the set inhibited aluminous cement slurry. Such slurries can be stored during several months up to two years or longer without losing their applicability. When mixed with an initiator immediately before application, they produce a fast hardening mortar.

The amount of the set inhibitor in component A is dependent on the type of set inhibitor, type and amount of aluminous cement and the desired storage time of component A. The higher the amount of set inhibitor in component A, the higher is the needed amount of initiator in component B to initiate the hydration reaction. Preferably the set inhibitor is added in such an amount as to inhibit the hydration of the aluminous cement in component A for at least from 1 week to about 2 years, more preferred from 2 months to 1 year, even more preferred from 3 months to 1 year at 10 to 50° C.

Suitable set-inhibited aluminous cements in the form of aqueous slurries are described in US 2014/0343194. They are commercially available, for example from Kerneos, France, under the brand name Exalt.

Component B of the multi-component mortar system comprises an initiator system for the set-inhibited aluminous cement. By mixing component A and component B, the initiator system is able to overcome the set-inhibition effect, usually by increasing the pH of the system, and to start the hydration reaction, leading eventually to a set mortar which forms a hardened body.

Preferably, the initiator system in component B comprises an alkaline compound selected from the group consisting of alkali hydroxide, earth alkali hydroxide, compounds that can generate hydroxides when in contact with water, like earth alkali oxides or alkali oxides, alkali silicate, alkali aluminate, amines and mixtures thereof.

Preferred thereof are amines, earth alkali hydroxides, earth alkali oxides and alkali hydroxides.

Amines, particularly water soluble organic amines, are very effective to initiate the hydration reaction. Preferred amines are hydroxyalkylamines, particularly ethanolamine, diethanolamine, N-methylethanolamine or N-methyl diethanolamine. These amines are easily mixed with the filler and do not increase the viscosity of component B in an undesired way.

The content of a hydroxyalkylamine in component B is preferably in the range of 1 to 10 weight-%, more preferably 1 to 6 weight-%. At concentrations of the hydroxyalkylamine in component B below 1 weight-%, the hardening of the mortar could be too slow and/or the strength development insufficient. Higher concentrations of hydroxyalkylamine in component B may lead to bad smell of the component B and of the fresh mortar.

Earth alkali hydroxides and earth alkali oxides, particularly calcium hydroxide and calcium oxide, are available as powder and can easily be handled. They can initiate the hydration reaction already at low concentration.

Alkali hydroxides, particularly sodium hydroxide, are available at low price, are odourless and can initiate the hydration reaction already at low concentration. The content of the earth alkali or alkali hydroxide in component B is preferably in the range of 0.05 to 4 weight-%, more preferably 0.05 to 2 weight-%. In certain embodiments the range is preferably 0.05 to 1 weight-%, and more preferably 0.05 to below 0.5 weight-%. A low concentration of the earth alkali or alkali hydroxide in component B is advantageous since these hydroxides have a corrosive effect. Furthermore, a high amount thereof increases the viscosity of the slurry, particularly if calcium carbonate is used as mineral filler. Thus, more water is necessary to get the desired consistency, which has a negative effect on the strength of the hardened mortar.

Preferably, the initiator system comprises, in addition to the alkaline compound, an accelerator for the hydration reaction.

The use of two different components, one to initiate the hydration reaction and one to accelerate it, enables to control the start and the speed of the hydration reaction and the strength development.

The accelerator is preferably selected from the group consisting of sulphates, carbonates, chlorides and fluorides of lithium, sodium or potassium, and mixtures or combinations thereof. Preferably, the accelerator is a lithium derivative. The lithium derivative is preferably selected from the group consisting of lithium sulphate, lithium carbonate, lithium hydrogen carbonate, lithium hydroxide and mixtures thereof.

A particularly preferred accelerator is lithium sulphate. Suitable are all types of lithium sulphate, such as anhydrous lithium sulphate, lithium sulphate monohydrate, lithium hydrogen sulphate or lithium hydrogen sulphate monohydrate; preferred is lithium sulphate monohydrate, as the solubility of lithium sulphate monohydrate in water is higher than that of anhydrous lithium sulphate.

Another particularly preferred accelerator is lithium carbonate or lithium hydrogen carbonate, preferably lithium carbonate. Lithium carbonate, especially as very fine powder, has a strong accelerating effect and enables mortars that can set within minutes.

The content of the lithium derivative in component B is preferably in the range of 0.05 to 8 weight-%, more preferably 0.05 to 4 weight-%, even more preferably 0.05 to 2 weight-%, and most preferably 0.1 to 2 weight-%.

The multi-component mortar system of the present invention may contain a third component C besides components A and B. Component C may comprise fibres, colouring agents, an epoxy resin, a polymer latex or a polyurethane resin or may be a foam.

Advantageously, component A and component B of the multi-component mortar system both comprise separately at least one mineral filler.

The mineral filler is preferably selected from materials of the group consisting of calcium carbonate, dolomite, titanium dioxide, silicon dioxide, fly ash, slag, river sand, sand from sediments and crushed stone and mixtures thereof.

The calcium carbonate fillers may be selected from the group consisting of chalk, limestone and marble. Such calcium carbonate fillers are for example produced by Omya, Switzerland, and sold for example under the tradenames Omyacarb®, Omyalite® and Betoflow®.

The silicon dioxide may be selected from the group consisting of silica fume (also known as silica smoke or micro silica), precipitated silica, quartz sand and quartz flour. Silica fume and precipitated silica primarily consist of amorphous silicon dioxide. Quartz flour, also called silica flour, is finely ground quartz sand. Quartz sand and quartz flour primarily consist of crystalline silicon dioxide. Fly ash is a by-product of the combustion of pulverized coal in electric power generation plants and is collected from the exhaust. Fly ash is a fine powder consisting mainly of silicate glass containing silica, alumina, iron and calcium. Slag, also called blast furnace slag, is formed as non-metallic by-product when iron ore, coke and a flux (for example limestone or dolomite) are melted together in a blast furnace. During the period of cooling and hardening from its molten state, slag can be cooled in several ways to form several types of slag products. Slag is used in the form of a fine powder.

Finely ground calcium carbonate, although not being latent hydraulic, can contribute to increase the final strength of the hardened mortar. Thus, it is advantageous to use it in either component A or component B or in both.

Preferably, the mineral filler in component A comprises at least 50 weight-% calcium carbonate, more preferably at least 60 weight-%, and most preferably at least 75 weight-%, based on the total weight of mineral filler in component A.

Preferably, the mineral filler in component B comprises at least 50 weight-% calcium carbonate, more preferably at least 60 weight-%, and most preferably at least 75 weight-%, based on the total weight of mineral filler in component B. In a more preferred embodiment, both component A and component B, each separately, comprise at least 50 weight-% calcium carbonate, more preferably at least 60 weight-%, and most preferably at least 75 weight-% based on the total weight of mineral filler in the respective component.

In certain embodiments, both component A and component B, each separately, comprise 100 weight-% calcium carbonate as mineral filler.

If fly ash or slag is present in the mortar system, they are preferably part of component A. They are both so-called latent hydraulic binders, which means, that in presence of additives, they can react with water to form a hardened body. Thus, they can contribute to the final strength of the hardened mortar, which is advantageous.

In a preferred embodiment, component A contains from 30 to 78 weight-%, more preferably from 50 to 78 weight-%, even more preferably from 51 to 78 weight-% and most preferably from 60 to 78 weight-% mineral filler.

In a preferred embodiment, component B contains from 65 to 86 weight-%, more preferably from 70 to 86 weight-% and most preferably from 75 to 86 weight-%, mineral filler.

A high content of filler enables mortars with low content of aluminous cement which is of advantage with respect to costs and durability of the hardened structure produced with the mortar system.

In a preferred mortar system component A comprises 10 to 50 weight-% aluminous cement and 30 to 78 weight-% mineral filler, based on the weight of component A, and component B comprises 65 to 86 weight-% mineral filler, based on the weight of component B.

Preferably both, component A and component B, each separately, have high solids content, with the rest being water for component A and water plus amine, if present, for component B. A high solids content increases the storage stability of the slurries which means, that the slurries remain homogeneous without separation or bleeding, and a low water content has a positive effect on the strength of the hardened mortar.

If the solids content of component A and component B differ strongly, especially if component A is a suspension with high solids content and component B is an aqueous solution or a suspension with a solids content of 50 weight-% or below, this may cause problems for the homogeneous mixing of component A and component B, especially when mixed by hand or with a static mixer.

Preferably the content of water in component A is from 10 to 25 weight-%, more preferably 10 to 20 weight-%, and most preferably 10 to 18 weight-%. Preferably the content of water in component B is from 10 to 25 weight-%, more preferably 12 to 22 weight-% and most preferably 12 to 20 weight-%.

Preferably component A and component B, each separately, have the following weight compositions.

Component A contains preferably from 10 to 19 weight-% aluminous cement, from 60 to 78 weight-% mineral filler, from 0.01 to 5 weight-% additives including the set inhibitor, and from 10 to 18 weight-% water.

In a preferred embodiment of the invention, component B contains from 70 to 86 weight-% mineral filler, from 0.05 to 2 weight-% NaOH, from 0.05 to 2 weight-% lithium salt, from 0 to 5 weight-% additives, and from 12 to 22 weight-% water.

In a further preferred embodiment of the invention, component B contains from 70 to 86 weight-% mineral filler, from 1 to 6 weight-% hydroxyalkylamine, from 0.05 to 2 weight-% lithium salt, from 0 to 5 weight-% additives, and from 12 to 22 weight-% water.

To achieve such high solids contents in component A and component B without increasing their viscosity in an undesired amount, a thorough control of the particle size distribution of the mineral filler and the aluminous cement is important.

In a preferred embodiment of the invention, at least 85 weight-% of the particles of the mineral filler in component A and component B are smaller than 0.3 mm, preferably smaller than 0.2 mm.

In a particularly preferred embodiment, from 40 to 80 weight-% of the particles of the mineral filler in component A and component B are smaller than 10 μm, and from 70 to 100 weight-% of the particles of the mineral filler in component A and component B are smaller than 100 μm.

Such particles sizes and mineral fillers enable components with low tendency to separate, good storage stability and easy conveying and mixing of the components, and hardened mortars with particularly high strength short after application, particularly with a compressive strength of the hardened mortar system of more than 5 MPa after 8 hours.

In a most preferred embodiment the particle size distribution of the components A and B is very similar. A preferred particle size distribution is within the following limits:

from 5 to 30 weight-% of the particles are smaller than 1 μm,
from 30 to 65 weight-% of the particles are smaller than 5 μm,
from 40 to 75 weight-% of the particles are smaller than 10 μm,
from 70 to 100 weight-% of the particles are smaller than 100 μm,
from 80 to 100 weight-% of the particles are smaller than 200 μm,
from 90 to 100 weight-% of the particles are smaller than 400 μm.

A mortar system with such granulometry can be mixed homogeneously and fast, particularly also with a static mixer, and enables mortars which are self-supporting immediately after mixing of the components. Such a mortar system is particularly suitable to be applied with a robotic system in a 3D printing process.

Component A and component B, both separately, may contain further additives. Such additives are preferably selected from dispersing agents, stabilizers, shrinkage reducers, air detraining agents, air entraining agents, calcium complexing agents, rheology modifiers, colouring agents and biocides.

For the production of coloured mortars, organic or inorganic pigments or colouring agents may be added. In this case, the mineral fillers in component A and component B are preferably white, such as powdered or ground white marble or titanium dioxide or mixtures thereof, and the aluminous cement in component A is also white, such as Ternal® White (from Kerneos, France). Suitable dispersing agents are particularly plasticizers or superplasticizers for cementitious materials, such as hydroxy carboxylic acids, lignosulfonates, sulfonated acetone formaldehyde condensates, sulfonated melamine condensates, sulfonated naphthalene condensates, polyalkylene glycols with phosphonate or phosphate groups at the end of the polymer chain, comb polymers comprising a backbone to which anionic groups and/or their salts and polyalkylene glycol chains are connected, wherein the anionic groups are selected from the group consisting of carboxylic acid, sulfonic acid, sulfate, phosphonic acid and phosphate. Preferred dispersing agents are polycarboxylic ethers (PCE) which are comb polymers, containing carboxylic acid groups or their salts and polyalkylene glycol chains.

Suitable dispersing agents are particularly dispersing agents for calcium carbonate, such as linear, water soluble polymers containing anionic groups, wherein the anionic groups are selected from the group consisting of carboxylic acid, sulfonic acid, sulfate, phosphonic acid and phosphate. Preferred dispersing agents are polyacrylic acid, polymethacrylic acid, copolymers of acrylic acid and methacrylic acid or copolymers of acrylic acid or methacrylic acid with maleic acid or itaconic acid.

The rheology modifiers are preferably selected from synthetic and natural polymers and modified natural polymers. Such rheology modifiers are for example cellulose ethers or esters, modified starches, xanthan gum, welan gum, diutan gum or carrageenan. Preferred is methyl cellulose, hydroxyethyl cellulose, methyl-hydroxyethyl cellulose, diutan gum or xanthan gum.

The rheology modifier may also be small sized fibres, preferably cellulose fibres, such as Arbocel® fibres (from JRS, USA).

For a good fresh and hardened performance of the multi-component mortar system it is very important that the components are mixed fast, efficient and homogeneously, especially for the use in 3D printing.

The mixing of components that differ strongly in their consistency and/or in the amount used, can be difficult, especially when mixed by hand or with a static mixer, and the mixing may need long time or even may remain insufficient.

Usually, suspensions with a high content of solids are difficult to mix thoroughly and homogeneously, especially when a static mixer is used.

In this invention, it has unexpectedly and surprisingly been found, that component A and component B can easily be pumped without any separation, and that the mixing, especially with a static or dynamic mixer, is very homogeneous if both components have the same consistency, preferably being a paste with low viscosity.

In a preferred embodiment of the invention the consistency of component A and component B, each separately, is paste-like with a plastic viscosity in the range of 20 to 2,000 Pa·s, preferably 200 to 1,900 Pa·s, more preferably 500 to 1,500 Pa·s, at a shear rate of 1 $s^{-1}$, measured with a plate-plate rheometer (Physica MCR 301, Anton Paar, Austria; Software Rheoplus) with a plate diameter of 25 mm and 2 mm gap.

In a specially preferred embodiment of the invention the consistency of component A and component B, each separately, is paste-like with a plastic viscosity in the range of 20 to 2,000 Pa·s, preferably 200 to 1,900 Pa·s, more preferably 500 to 1,500 Pa·s, at a shear rate of 1 $s^{-1}$, and in the range of 5 to 1,000 Pa·s, preferably 40 to 800 Pa·s, more preferably 60 to 800 Pa·s, at a shear rate of 10 $s^{-1}$, measured as described above.

The paste-like consistency and comparable viscosity of component A and component B is of advantage for the accurate dosing of the components. Furthermore, such components can easily be transported to and through the mixing equipment and are easily mixed fast and homogeneously to a self-supporting and fast hardening material. These are important properties for the use in a robotic system.

The production of component A and component B is not limited to any specific method. All ingredients of each are mixed with a suitable method to give finally a macroscopically homogenous material, whereas no particular order is preferred. However, it is of advantage to mix the aluminous cement, the set-inhibitor and at least part of the water separately to obtain a set-inhibited aluminous cement slurry. During the mixing of component A and/or component B or in a separate step, entrained air may be removed for example by applying a vacuum. Air voids in the components may lead to improper dosing of the components, improper mixing and failures in the built structure, especially when a static mixer and a robotic printing system are used.

In a preferred embodiment of the invention, the components of the multi-component mortar system are each packed in separate containers, where they can be stored during several months up to two years or longer without losing their applicability, and mixed immediately before application to produce a fast setting mortar. A suitable container to store the components is preferably waterproof, particularly a cartridge, a sausage, a bag, a can, a bucket, a hobbock, a drum or a so-called intermediate bulk container (IBC container). Preferably, the container for component A and component B, each separately, is made of a plastic material or has an internal coating.

The components are advantageously provided in a package which consists of mutually separated chambers.

In case of a two-component composition, suitable packages consist of a packaging with two mutually separated chambers, each chamber containing one of the two components of the 2-component mortar system.

Preferred packages of this type are side-by-side double cartridges or coaxial cartridges in which two tubular chambers are arranged next to one another or one inside the other and closed with pistons in an air and moisture tight manner. By propelling these pistons, the components can be pressed out of the cartridge. The sides of the tube facing the pistons are modified, possibly via an adapter, such that the chamber openings in the area of the opening are directly connected to one another via a separation wall. Advantageously, in the area of the outlet opening of the chambers, a thread is applied, so that a static mixer or a dynamic mixer can be attached tightly.

Other suitable packages are multi-chamber bags. Such packages are preferable in particular for small applications, in particular for filling quantities of up to 1 liter.

For uses in larger quantities, in particular for uses in construction industry or manufacturing, the two components are advantageously filled and stored in drums or larger containers like silos. During use, the components are pressed out via feed pumps and added by metering via lines of a mixing apparatus.

To use the mortar system, the separately stored components are mixed together. All methods to homogeneously mix pastes or suspensions are suitable. The components can be mixed for example by hand with a trowel or spatula, with a dynamic or a static mixer, or a combination of both, continuously or in batch. Since component A and component B preferably have comparable viscosities, the mixing of such a system is easy and fast even at low or moderate mixing speed or mixing force.

Another object of the invention is therefore a process for producing a mortar by mixing component A and component B and further components, if present, of the multi-component mortar system particularly with a static or a dynamic mixer.

In a preferred embodiment of the present invention, a static mixer is used for mixing the components. In a static mixer, mixing elements are arranged in a jacket that provide for a homogeneous intermixing of components by using the flow energy of the components which are fed into the static mixer under pressure. Static mixers are easy to use, cheap and are particularly suited for one-way use which is of advantage, especially for the do-it-yourself market.

For mixing of component A and component B with a static mixer it is particularly useful when both components have about the same viscosity in the range of 20 to 2,000 Pa·s, preferably 200 to 1,900 Pa·s, more preferably 500 to 1,500 Pa·s, at a shear rate of 1 s$^{-1}$, and in the range of 5 to 1,000 Pa·s, preferably 40 to 800 Pa·s, more preferably 60 to 800 Pa·s, at a shear rate of 10 s$^{-1}$.

Vacuum may be applied during mixing to avoid undesired air entrainment in the mortar which may cause reduced strength and air voids may lead to improper deposition and unsatisfying surface structure.

After mixing of the components of the multi-component mortar system, there results a mortar, which is, immediately after mixing, a so-called fresh mortar and sets finally to a hardened material.

By mixing the components of the mortar system, the set-inhibited aluminous cement comprised in component A comes into contact with the initiator system comprised in component B. The initiator system de-blocks the set inhibiting effect of the set inhibited aluminous cement and the cement starts to react with water to form calcium aluminate hydrates, which results finally in a hardened body with a three-dimensional structure.

An object of the present invention is therefore a mortar, obtained by mixing component A and component B and further components, if present, as described above.

A suitable ratio in which component A and component B are mixed depends on the desired properties of the fresh and hardened mortar. Preferably component A and component B are mixed in a ratio of from 10:1 to 1:1, more preferably 5:1 to 1:1, and most preferably 3:1 to 1:1, by weight.

Mortars change their volume during setting and hardening, resulting in some shrinkage. One factor influencing this is the chemical reaction. The hydration reaction of aluminate cement leads to the formation of calcium aluminate hydrates, which causes changes in volume and increases porosity. Mortars containing a high content of aluminous cement typically show a high porosity and a high degree of shrinkage. When hardening begins, shrinkage and expansion will cause inner strains eventually leading to cracks if this strain is higher than the strength of the material.

The hydration of aluminous cement generates heat. The temperature of mortars containing a high content of aluminous cement can rise up to 80° C. and more during hardening. Such high temperatures can lead to increased vapour pressure in the hardening system which may cause the formation of cracks. Porosity and cracks can finally lead to reduced durability since the porous and cracked hardened body is prone to physical and chemical attack. A low amount of aluminous cement in the mortar is therefore advantageous from the point of view of durability of the hardened material.

Preferably, the content of aluminous cement in the fresh mortar, calculated as non-hydrated aluminous cement, is from 5 to 45 weight-%, preferably 7 to 35 weight-%, more preferably 7 to 25 weight-% and most preferably 7 to 19 weight-%, based on the weight of the fresh mortar. Such a low content of aluminous cement is advantageous with respect to cost and durability of the mortar and health of the people applying it.

Surprisingly it was found, that even with such low amount of aluminous cement, hardened materials with high strength short after application are obtained with the multi-component mortar system of the present invention, particularly with a compressive strength of the hardened mortar of more than 5 MPa after 8 hours.

In a preferred embodiment of the invention, the fresh mortar contains at least one earth alkali or alkali hydroxide. In such a system, the amount of hydroxide with respect to aluminous cement in the fresh mortar is dependent on the amount of set-inhibitor and the desired setting time of the mortar. Preferably the content of hydroxide (OH$^-$) in the fresh mortar is in the range of 0.05 to 7.5 g, more preferably 0.05 to 2.0, even more preferably 0.05 to 1.0, in certain embodiments preferably in the range from 0.05 to 0.50 g, more preferably 0.05 to 0.34 g, per 100 g of aluminous cement.

In another preferred embodiment of the invention, the fresh mortar contains at least one hydroxyalkylamine preferably in the range of 1 to 50, more preferably 2 to 35 and even more preferably 6 to 30 g per 100 g of aluminous cement. If the fresh mortar contains a lithium salt, the amount of lithium (Li$^+$) in the fresh mortar is preferably in the range of 0.01 to 4.0 g, more preferably 0.01 to 1.0, even more preferably 0.01 to 0.45, and most preferably 0.01 to 0.2 g, per 100 g of aluminous cement.

The fresh mortar prepared from the multi-component mortar system is preferably self-supporting without sagging immediately after mixing of the components. This mortar keeps its structure given directly after placing or extrusion within about 10% of the original dimension in all directions if no external force is applied.

Preferably, the fresh mortar has a yield stress in the range of 50 to 5,000 Pa, more preferably 100 to 2,000 Pa, most preferably 100 to 1,000 Pa, measured with a plate-plate rheometer (Physica MCR 301, Anton Paar, Austria; Software Rheoplus) with a plate diameter of 25 mm and 2 mm gap at a decreasing shear rate from 10 to 0.1 s$^{-1}$, directly after mixing of the components. Such a fresh mortar maintains the applied structure without sagging.

In a preferred system, the setting of the mortar, measured with an automated Vicat apparatus according to EN 196-3, starts within 1 to 60 minutes, preferably within 1 to 30 minutes, more preferably within 1 to 15 minutes, even more preferably within 1 to 5 minutes, after component A and component B have been in contact with each other. This is advantageous, since the mixing of the mortar takes some seconds to minutes. Thus the setting does not start in the mixing equipment and the mortar does not block the mixer. When the setting of the mortar has started, the strength of the mortar increases quickly.

In a preferred system, the mortar has a compressive strength, measured according to EN 196-1, of at least 1 MPa 60 minutes, more preferably 40 minutes, even more preferably 30 minutes, most preferably 20 minutes, after component A and component B have been in contact with each other. Such a system is particularly suitable for 3D printing.

The mortar system is preferably used for repair and refurbishment and suited for the professional as well as do-it-yourself use. The inventive mortar system is a ready-to-use system with particularly easy handling. It is particular suitable for concrete and mortar repair work, such as filling holes or cracks or replacing broken parts or for fire protecting openings in floors and walls. The fast hardening mortar is particularly useful for emergency repair of concrete and mortar structures, particularly to stop ingress of water.

Furthermore, the inventive mortar system is particularly suitable for the use in 3D printing.

For these uses, a mortar system with good self-supporting qualities immediately after mixing of the components and a fast built-up of strength is particularly advantageous.

A further object of the present invention is therefore the use of the mortar system as described above, in which the fresh mortar is self-supporting without sagging immediately after mixing of the components, and has a compressive strength of at least 1 MPa 60 minutes, preferably 40 minutes, more preferably 30 minutes, and most preferably 20 minutes, after mixing of the components. Preferably, the fresh mortar has a yield stress in the range of 50 to 5,000 Pa, more preferably 100 to 2,000 Pa, most preferably 100 to 1,000 Pa, measured as described above.

In such a mortar system, the fresh mortar is self-supporting but still deformable for some time, and setting starts soon and development of compressive strength is fast. These qualities are very advantageous for the use in repair and refurbishment and particularly in 3D printing.

A further object of the present invention is the use of the described mortar system for 3D printing, particularly for 3D printing by a robotic system.

In a robotic system for printing 3D structures the components are usually dosed in the pre-defined amount through a dosing device which is able to convey the desired amount of the components in mass or volume in the desired speed to the mixer. In the mixer, which may be static or dynamic or a combination of both, the components are mixed and the fresh mortar is conveyed through the nozzle and is placed at the pre-defined position. The placing of the mortar is performed by a robotic system. This robotic system may consist of a movable robot arm onto which the mixer and the nozzle are mounted. The robot arm can move in all 3 dimensions and moves in the pre-defined or online calculated way and speed. The fresh mortar is deposited continuously or discontinuously, usually in several layers, in vertical and/or in horizontal direction. The layers must have sufficient yield stress or compressive strength before the next vertical layer can be applied and must be able to bind with the next layer. This can be optimized by proper selection of the initiator and accelerator system and the speed of the deposition of the mortar.

Therefore, the components A and B and optionally further components are mixed in such a ratio that the fresh mortar, when leaving the mixer, is still in a plastic state, so that it is formable by the nozzle, is non-sagging and self-supporting and has sufficient yield stress and/or fast development of compressive strength to support the next layers of fresh mortar, which are applied on top after a short period of time.

In a preferred embodiment, the mortar system is used for 3D printing in such a way, that its components are mixed with a static or dynamic mixer, and the mixed components are applied by a robotic system.

In a preferred embodiment, the mortar system used for 3D printing contains fibres that can replace the traditional reinforcement in concrete or mortar structures. The size of the fibres is selected in such a way that it is compatible with the mixing system and does not block or hamper the mixing. The fibres are particularly linear or branched metal fibres, plastic fibres, mineral fibres or glass fibres, coated or uncoated. The fibres, if present, can be part of component A and/or component B or can be in a separate component C.

Thus, 3D structures of various shapes and colours, from small pieces to large constructions, can be produced in a fast and efficient way without the use of moulds or other supporting systems.

The nozzle of a suitable robotic system may have various shapes and sizes. Preferably it is of a round or square or rectangle shape. The size of the outlet of the nozzle may range from millimeters to centimeters or may be even larger.

A further object of the present invention is a process for printing a 3D structure comprising the steps of
  i) providing the described multi-component mortar system,
  ii) mixing the components with a static or dynamic mixer and applying the mixed mortar with a robotic system to form a 3D structure, and
  iii) curing of the applied 3D structure.

Preferably, the components of the multi-component mortar system are provided in separate containers, separate cartridges or in separate compartments of a cartridge.

Preferably, mixing of the components is done by passing the components through a static mixer until a macroscopically homogenous fresh mortar is obtained, followed by discharging the fresh mortar through a nozzle.

A further object of the present invention is a 3D structure obtained from the process for printing a 3D structure described above.

Various 3D structures for indoor or outdoor use can be produced, with various shapes and colours or multi-colour. The size and design of them is only limited by the robotic system used, especially by the shape of the nozzle.

The 3D structure is preferably a small sized object, such as a table, a bank, a chair, a stool, a garden bench, or a small house, such as a garden house, a dog house, a Wendy house or a bird house, or troughs, vases, pots, tubes, bowls, fountains, fencing parts, pillars, decorative elements or others the like, or parts thereof.

It is also possible to produce larger 3D structures such as walls, houses, stairs, balconies, floors or facades, or parts thereof.

If desired, the surface of the printed 3D structure can be smoothed. Such smoothing can be done as part of the robotic system or with other means. If desired, the surface can be treated with decorative and/or functional coatings, or the surface may be painted.

The 3D structures obtained from the process for printing a 3D structure described above have a good durability, which is particularly advantageous for outdoor use. They have a low porosity and no or negligible cracks, enabled by the low content of aluminous cement and the high content of filler with optimized grading. The structures have a nice aesthetic aspect as the surface is free of visible cracks or holes. Structures produced with a 3D printing robotic system are geometrically very precise and are producible in a fast and cheap way, even in small series, without a mould.

EXAMPLES

The following examples, without being limitative, illustrate the present invention.

1. Materials

Omyacarb® 5 (Omya) is a fine, white calcium carbonate powder made from marble, mean particle size (D50%) 2.5-3 µm, top cut (D98%) 20 µm, with 28 weight-% smaller than 1 µm, 86 weight-% smaller than 10 µm and 100 weight-% smaller than 45 µm.

Omyacarb® 40-GU (Omya) is a fine, white calcium carbonate powder made from marble, mean particle size (D50%) 20 µm, top cut (D98%) 180 µm, with 10 weight-% smaller than 1 µm, 36 weight-% smaller than 10 µm, 69 weight-% smaller than 45 µm and 88 weight-% smaller than 100 µm.

Omyalite® 90 (Omya) is a natural, ultra-fine calcium carbonate powder, mean particle size (D50%) 1.5 µm, top cut (D98%) 25 µm, with 27 weight-% smaller than 1 µm, 94 weight-% smaller than 10 µm and 99 weight-% smaller than 45 µm.

Limestone Y grade (Omya) is a ground limestone powder, mean particle size (D50%) 125 µm, top cut (D98%) 305 µm, and 2.5 weight-% smaller than 1 µm, 6 weight-% smaller than 10 µm, 12 weight-% smaller than 45 µm, 39 weight-% smaller than 100 µm and 82 weight-% smaller than 200 µm.

Nekafill® 15 (Kalkfabrik Netstal) is a ground limestone powder, mean particle size (D50%) 11 µm, top cut (D98%) 125 µm, with 7.6 weight-% smaller than 1 µm, 49 weight-% smaller than 10 µm, 77 weight-% smaller than 45 µm and 95 weight-% smaller than 100 µm.

Quartz flour K8 is a finely ground quartz (Carlo Bernasconi, Switzerland), 97 weight-% smaller than 71 µm.

Quartz sand 0.06-0.2 mm is a ground quartz (Quarzwerke, Austria), mean particle size (D50%) 160 µm, top cut (D98%) 365 µm, with 0.2 weight-% smaller than 1 µm, 0.8 weight-% smaller than 10 µm, 1.1 weight-% smaller than 45 µm, 9 weight-% smaller than 100 µm and 74 weight-% smaller than 200 µm.

Exalt (Kerneos, France) is a white set-inhibited aluminous cement suspension containing about 40 weight-% water, about 58 weight-% aluminous cement with about 67 weight-% alumina, and is free of boric acid.

Ternal® LC (Kerneos, France) is an aluminous cement with 50.8-54.2 weight-% alumina.

ViscoCrete® 510P (Sika, Switzerland) is a superplasticizer powder of the PCE-type.

Sokalan® PA 15 (BASF) is an aqueous solution of a polyacrylic acid Na-salt with 45 weight % solids.

Methocell™ F4M (DOW) is a hydroxypropyl-methyl cellulose.

Kelco-Crete® (CP Kelco) is diutan gum powder, a bacterial polysaccharide.

2. Measuring Methods

The particle size distribution of the calcium carbonate fillers was measured with laser granulometry using HELIO (Sympatec GmbH) with dispersing device Quixel, with static laser scattering with red laser of 633 nm, using isopropanol as solvent and ultrasound treatment.

The particle size distribution of the quartz sand was determined by dynamic image analysis using Quicpic (Sympatec GmbH) with Gadis (free fall by gravitation), using a pulsed green light source, the pictures were taken at 300 pictures per second and were analysed using EQPC (according to ISO 13322-2 standard).

The drying shrinkage of the mortar was registered as the decrease in length of a test specimen. A U-shaped shrinkage-drain of stainless steel with 40 mm height, 40 mm width and 160 mm length was used. To avoid wall friction the drain was treated with form-oil. On one side of the drain an anchor is fixed, on the other side this anchor is movable. The shrinkage-drain was filled with the fresh mortar immediately after mixing. The motion of the movable anchor was registered by a high sensitive digital probe.

The compressive strength of the mortar was measured on prisms of 40×40×160 mm size. The specimens were produced immediately after mixing by filling the moulds with the mortar and smoothing the surface with a trowel. The moulds were stored at 20 to 23° C. in the laboratory. A series of prisms was produced and the prisms were demoulded and tested at predefined time intervals. The strength of the prisms was measured according to EN 196-1. The setting time of the mortar was measured with the automated Vicat apparatus Vicatronic, with 1 mm needle according to EN 196-3.

The temperature development of the mortar was measured by semi-adiabatic measurement. 120 g of mortar were filled into an isolated cup of 40 mm diameter and 50 mm height and the temperature was measured with a thermocouple.

3. Preparation of Components A

Preparation of Component $A_1$

All powder components were added to the mixing bowl of a mechanical mixer (KitchenAid Model ARTISAN, 5KSM150) in the amounts given in table 1. The powder was mixed at speed 1 for 15 seconds, next Exalt and water were added and all was mixed for 1 minute at speed 2. The mixer was stopped, the mass was homogenized by hand with a spatula and then mixed again for 2 minutes at speed 4.

TABLE 1

Composition of component $A_1$

|  | g | Weight-% |
| --- | --- | --- |
| Omyacarb ® 5 | 150 | 30.0 |
| Omyacarb ® 40-GU | 150 | 30.0 |
| Limestone Y grade | 50 | 10.0 |
| Exalt | 100 | 20.0 |
| Tap water | 50 | 10.0 |

Preparation of Component $A_2$

Component $A_2$ was prepared in the same way as component $A_1$ with the ingredients given in table 2.

TABLE 2

Composition of component $A_2$

|  | g | Weight-% |
| --- | --- | --- |
| Nekafill ® 15 | 580.5 | 38.7 |
| Omyalite ® 90 | 258.0 | 17.2 |
| Quartz sand 0.06-0.2 mm | 193.5 | 12.9 |
| Exalt | 430.5 | 28.7 |
| ViscoCrete ® 510P | 3.0 | 0.2 |
| Tap water | 34.5 | 2.3 |

Preparation of Component $A_3$

Component $A_3$ was prepared in the same way as component $A_1$ with the ingredients given in table 3. It had a plastic viscosity of 250 Pa·s at 1 $s^{-1}$, 70 Pa·s at 10 $s^{-1}$ and a yield stress of 100 Pa.

TABLE 3

Composition of component $A_3$

|  | g | Weight-% |
| --- | --- | --- |
| Omyacarb ® 40-GU | 675.0 | 38.30 |
| Omyalite ® 90 | 300.0 | 17.02 |
| Quartz sand 0.06-0.2 mm | 225.0 | 12.77 |
| Exalt | 500.0 | 28.37 |
| ViscoCrete ® 510P | 3.6 | 0.20 |
| Methocell ™ F4M | 0.75 | 0.04 |
| Tap water | 58.0 | 3.30 |

Preparation of Component $A_4$

Component $A_4$ was prepared as component $A_3$ but with 250 g instead of 58 g water. The mixing of the components needed longer time and higher speed to be homogeneous than for component $A_3$.

Component $A_4$ had a plastic viscosity of 20 Pa·s at 1 s$^{-1}$, 5 Pa·s at 10 s$^{-1}$ and a yield stress of 7 Pa.

Preparation of Component $A_5$

Component $A_5$ was prepared as component $A_3$ but with 7.5 g instead of 58.0 g water.

Component $A_5$ had a plastic viscosity of 1,230 Pa·s at 1 s$^{-1}$, 610 Pa·s at 10 s$^{-1}$ and a yield stress of 570 Pa.

Preparation of Component $A_6$

Component $A_6$ was prepared in the same way as component $A_1$ with the ingredients given in table 4.

TABLE 4

Composition of component $A_6$

|  | g | Weight-% |
|---|---|---|
| Omyacarb ® 40-GU | 655.0 | 43.68 |
| Omyalite ® 90 | 281.0 | 18.74 |
| Quartz sand 0.06-0.2 mm | 191.0 | 12.74 |
| Exalt | 250.0 | 16.67 |
| ViscoCrete ® 510P | 3.0 | 0.20 |
| Methocell ™ F4M | 0.6 | 0.04 |
| Tap water | 119.0 | 7.93 |

Preparation of Component $A_7$

Component $A_7$ was prepared in the same way as component $A_1$ with the ingredients given in table 5. It had a plastic viscosity of 530 Pa·s at 1 s$^{-1}$, 140 Pa·s at 10 s$^{-1}$ and a yield stress of 190 Pa.

TABLE 5

Composition of component $A_7$

|  | g | Weight-% |
|---|---|---|
| Omyacarb ® 40-GU | 536.0 | 35.73 |
| Omyalite ® 90 | 237.0 | 15.80 |
| Quartz sand 0.06-0.2 mm | 174.5 | 11.63 |
| Exalt | 549.0 | 36.60 |
| ViscoCrete ® 510P | 3.0 | 0.20 |
| Methocell ™ F4M | 0.6 | 0.04 |

Preparation of Component $A_8$

Component $A_8$ was prepared in the same way as component $A_1$ with the ingredients given in table 6. Component $A_8$ had a plastic viscosity of 700 Pa·s at 1 s$^{-1}$, 130 Pa·s at 10 s$^{-1}$ and a yield stress of 400 Pa.

TABLE 6

Composition of component $A_8$

|  | g | Weight-% |
|---|---|---|
| Omyacarb ® 40-GU | 971.0 | 48.3 |
| Omyalite ® 90 | 362.0 | 18.0 |
| Exalt | 595.0 | 29.6 |
| Kelco-Crete ® | 2.0 | 0.1 |
| Tap water | 80.7 | 4.0 |

Preparation of Component $A_9$

All raw materials in the amounts given in table 7 were weighted in a mixing cub and mixed with a mechanical mixer (KitchenAid Model ARTISAN, 5KSM150) for 1 minute at speed 2, then the mixer was stopped, the mass was homogenized by hand with a spatula and then mixed again for 2 minutes at speed 4.

TABLE 7

Composition of component $A_9$

|  | g | Weight-% |
|---|---|---|
| Exalt | 1350 | 67.5 |
| Quartz flour K8 | 240 | 12.0 |
| Quartz sand 0.06-0.2 mm | 410 | 20.5 |

Preparation of Component $A_{10}$

In a first step a set inhibited aluminous cement slurry was prepared by mixing the raw materials in the amount given in table 8. Kelco-Crete and the phosphoric acid were dissolved in the water in the mixing bowl of a mechanical mixer (KitchenAid Model ARTISAN, 5KSM150) and mixed for 15 seconds at speed 1. Ternal® LC and Sokalan® PA 15 were added and the mass was mixed for 1 minute at speed 2, then the mixer was stopped, the mass was homogenized by hand with a spatula and then mixed again for 2 minutes at speed 4.

TABLE 8

Composition of the set inhibited aluminous cement slurry

|  | g |
|---|---|
| Tap water | 162.93 |
| Ternal ®LC | 322.32 |
| Phosphoric acid 85% | 9.67 |
| Sokalan ® PA 15 | 4.83 |
| Kelco-Crete ® | 0.24 |

In a second step, all powder components of the raw materials given in table 9 were added to a mixing bowl of a mechanical mixer (KitchenAid Model ARTISAN, 5KSM150) in the amounts given in table 9. The powder was mixed at speed 1 for 15 seconds, next the aluminous cement slurry of step 1 and water were added and the slurry was mixed for 1 minute at speed 2. The mixer was stopped, the mass was homogenized by hand with a spatula and then mixed again for 2 minutes at speed 4.

TABLE 9

Composition of component $A_{10}$

|  | g | % |
|---|---|---|
| Omyacarb ® 40-GU | 675 | 37.35 |
| Omyalite ® 90 | 300 | 16.60 |
| quartz sand 0.06-0.2 mm | 225 | 12.45 |
| Aluminous cement slurry of step 1 | 500 | 27.66 |
| ViscoCrete ® 510P | 3.6 | 0.20 |
| Methocell ™ F4M | 0.75 | 0.04 |
| water | 103.0 | 5.70 |

4. Preparation of Components B

Preparation of Component $B_1$

The fillers (Omyacarb and Limestone) were added to the mixing bowl of a mechanical mixer (KitchenAid Model ARTISAN, 5KSM150) in the amounts given in table 8. The powder was mixed at speed 1 for 15 seconds. NaOH and Li$_2$SO$_4$·H$_2$O were dissolved in the water in the amounts given in table 8 and this solution was added to the powder. This mass was mixed for 1 minute at speed 2, then the mixer was stopped, the mass was homogenized by hand with a spatula and then mixed again for 2 minutes at speed 4.

TABLE 8

Composition of component $B_1$

|  | g | Weight-% |
| --- | --- | --- |
| Omyacarb ® 5 | 165 | 33.0 |
| Omyacarb ® 40-GU | 165 | 33.0 |
| Limestone Y grade | 55 | 11.0 |
| Tap water | 85 | 17.0 |
| NaOH | 10 | 2.0 |
| $Li_2SO_4 \cdot H_2O$ | 20 | 4.0 |

Preparation of Component $B_2$

Component $B_2$ was prepared in the same way as component $B_1$ with the ingredients given in table 9. ViscoCrete® 510P was added together with the fillers to the mixing bowl.

TABLE 9

Composition of component $B_2$

|  | g | Weight-% |
| --- | --- | --- |
| Nekafill ® 15 | 279.0 | 55.8 |
| Omyalite ® 90 | 86.0 | 17.2 |
| Quartz sand 0.06-0.2 mm | 64.5 | 12.9 |
| ViscoCrete ® 510P | 1.0 | 0.2 |
| NaOH | 0.5 | 0.1 |
| $Li_2SO_4 \cdot H_2O$ | 0.5 | 0.1 |
| Tap water | 68.5 | 13.7 |

Preparation of Component $B_3$

Component $B_3$ was prepared in the same way as component $B_2$ with the ingredients given in table 10. Methocell™ F4M was added together with the fillers to the mixing bowl. Component $B_3$ had a plastic viscosity of 850 Pa·s at 1 s$^{-1}$, 210 Pa·s at 10 s$^{-1}$ and a yield stress of 580 Pa.

TABLE 10

Composition of component $B_3$

|  | g | Weight-% |
| --- | --- | --- |
| Omyacarb ® 40-GU | 325.0 | 54.13 |
| Omyalite ® 90 | 100.0 | 16.65 |
| Quartz sand 0.06-0.2 mm | 75.0 | 12.49 |
| ViscoCrete ® 510P | 1.2 | 0.20 |
| Methocell ™ F4M | 0.75 | 0.12 |
| NaOH | 2.50 | 0.42 |
| $Li_2SO_4 \cdot H_2O$ | 1.0 | 0.17 |
| Tap water | 95.0 | 15.82 |

Preparation of Component $B_4$

Component $B_4$ was prepared as component $B_3$ but with 150 g instead of 95 g water. The mixing of the components needed longer time and higher speed to be homogeneous than for component $B_3$.

Component $B_4$ had a plastic viscosity of 70 Pa·s at 1 s$^{-1}$, 10 Pa·s at 10 s$^{-1}$ and a yield stress of 60 Pa.

Preparation of Component $B_5$

Component $B_5$ was prepared as component $B_3$ but with 86.5 g instead of 95 g water. It had a plastic viscosity of 1,900 Pa·s at 1 s$^{-1}$, 330 Pa·s at 10 s$^{-1}$ and a yield stress of 1860 Pa.

Preparation of Component $B_6$

All components were used in the amounts given in table 11. The powder components (Omyacarb® to pigment) were weighted in a mixing cub and mixed with a mechanical mixer (KitchenAid Model ARTISAN, 5KSM150) for 15 seconds at speed 2, then the mixer was stopped, ethanolamine was added and the mass mixed again for 1 minute at speed 2, the mixer was stopped, water and Sokalan® PA 15 were added and the mass again mixed for 2 minutes at speed 4. Component $B_6$ had a plastic viscosity of 780 Pa·s at 1 s$^{-1}$, 110 Pa·s at 10 s$^{-1}$ and a yield stress of 780 Pa.

TABLE 11

Composition of component $B_6$

|  | g | Weight-% |
| --- | --- | --- |
| Omyacarb ® 40-GU | 828.0 | 40.78 |
| Omyalite ® 90 | 828.0 | 40.78 |
| $Li_2CO_3$, fine powder | 20.0 | 0.99 |
| Kelco-Crete ® | 3.7 | 0.18 |
| Colouring pigment | 0.8 | 0.04 |
| Ethanolamine | 70.0 | 3.45 |
| Sokalan ® PA 15 | 0.8 | 0.04 |
| Tap water | 279.0 | 13.74 |

Preparation of Component $B_7$

Omyacarb, Omyalite and quartz sand were added to the mixing bowl of a mechanical mixer (KitchenAid Model ARTISAN, 5KSM150) in the amounts given in table 12. The powder was mixed at speed 1 for 15 seconds. NaOH and $Li_2CO_3$ were dissolved in the water in the amounts given in table 12 and this solution was added to the powder. The mass was mixed for 1 minute at speed 2, then the mixer was stopped, the mass was homogenized by hand with a spatula and then mixed again for 2 minutes at speed 4.

TABLE 12

Composition of component $B_7$

|  | g | Weight-% |
| --- | --- | --- |
| Omyacarb ® 40-GU | 325.0 | 53.15 |
| Omyalite ® 90 | 100.0 | 16.35 |
| Quartz sand 0.06-0.2 mm | 75.0 | 12.26 |
| ViscoCrete ® 510P | 1.2 | 0.20 |
| NaOH | 5.3 | 0.87 |
| $Li_2CO_3$, fine powder | 8.0 | 1.31 |
| Tap water | 97.0 | 15.86 |

Preparation of Component % for Comparison

NaOH and $Li_2SO_4 H_2O$ were mixed with the water in the amounts given in table 12. During mixing component $B_8$ became hot and was treated very carefully because of its high alkalinity.

TABLE 12

Composition of component $B_8$

|  | g | Weight-% |
| --- | --- | --- |
| Water | 43.3 | 43.3 |
| $Li_2SO_4 \cdot H_2O$ | 40.0 | 40.0 |
| NaOH | 16.7 | 16.7 |

Example 1: Application for 3D Printing 500 g of component $A_1$ and 500 g of component $B_1$ were filled in separate cartridges. The cartridges were installed in a robotic printing device. The components were dosed with pneumatic guns in equal volumes, mixed by a static mixing element and the resulting fresh mortar was extruded through a round shaped nozzle of 3.0 mm diameter. The mortar was applied by the robotic system in equal layers of about 2.5 mm height. The extrusion was made in such a way to form a 3D structure in the form of a square wall of about 90×90 mm length. For each horizontal layer 3 parallel layers were applied before the next vertical layer was built. In such a way 16 vertical layers, each formed by 3 horizontal layers were applied. Finally, a square wall structure of about 90 mm side length, about 40 mm height and about 10 mm wall thickness was formed. The speed of the nozzle was about 1,000 mm/min. The freshly applied mortar was immediately self-supporting, thus it kept its shape until hardening. After about 17 minutes the production of the structure was finished.

Examples 2 to 5: Preparation of Mortars

Component $A_2$ was mixed with component $B_2$ in the ratio given in table 13 with a mechanical mixer (KitchenAid Model ARTISAN, 5KSM150) for 1 minute at speed 2, then the mass was homogenized by hand with a spatula followed by mixing at speed 2 for 1 minute. The mortars had the properties given in table 13.

TABLE 13

Composition and properties of fresh and hardened mortar systems

| Example | 2 | 3 | 4 | 5 |
|---|---|---|---|---|
| Ratio A/B by weight | 1:1 | 2:1 | 3:1 | 4:1 |
| Cement in fresh mortar [weight-%] [1)] | 8.6 | 11.5 | 12.9 | 13.8 |
| W/C [2)] | 0.62 | 0.83 | 0.94 | 1.00 |
| Start setting [min] | 23 | 14 | 13 | 10 |
| Compressive strength [MPa] after 20 min. | <1 | 1.0 | 1.7 | 3.3 |
| after 30 min. | <1 | 3.4 | 4.0 | 4.8 |
| after 40 min. | 1.4 | 4.5 | 5.6 | 7.0 |
| after 1 hour | 4.5 | 6.5 | 9.2 | 9.6 |
| after 3 hours | 9.3 | 11.5 | 12.9 | 13.9 |
| after 8 hours | 10.2 | 12.3 | 13.4 | 14.2 |
| Maximal temperature [° C.] | n.m. [3)] | 34.2 | 35.5 | n.m. [3)] |
| Shrinkage after 8 hours [length-‰] | 0.563 | 0.625 | 0.669 | 0.713 |

[1)] weight-% dry Exalt
[2)] W/C is the weight ratio of the water to cement in the fresh mortar
[3)] not measured

Example 6: Application as Repair Mortar

The mortar of example 2 was used immediately after mixing to fill a hole of about 50 mm diameter and 10 mm depth in a concrete specimen. The mortar was filled in the hole and the surface was smoothed with a trowel. The patch did not show any cracks or damage after one day.

Examples 7 to 9: Preparation of Mortars 1,500 g of component A and 500 g of component B according to table 14 were mixed as described in example 2. The properties of the produced mortars are given in table 14.

TABLE 14

Composition and properties of fresh and hardened mortar systems

| Example | 7 | 8 | 9 |
|---|---|---|---|
| Component A | $A_3$ | $A_4$ | $A_5$ |
| Component B | $B_3$ | $B_4$ | $B_5$ |
| Cement in fresh mortar [weight-%] [1)] | 12.8 | 11.5 | 13.1 |
| W/C [2)] | 1.17 | 1.78 | 0.70 |
| Start setting [min] | 11 | 26 | n.m [3)] |
| Final set [min] | 15 | 37 | n.m [3)] |
| Compressive strength [MPa] after 20 min. | <1 | <1 | <1 |
| after 30 min. | <1 | <1 | <1 |
| after 40 min. | 1.1 | <1 | 4.5 |
| after 1 hour | 3.3 | <1 | 7.4 |
| after 3 hours | 6.3 | <1 | 11.3 |
| after 8 hours | 7.3 | <1 | 11.9 |
| after 48 hours | 8.9 | <1 | 15.7 |
| Maximal temperature [° C.] | 30.4 | 32.5 | 35.6 |
| Shrinkage after 8 hours [‰] | 0.734 | 1.591 | 0.427 |
| Shrinkage after 24 hours [‰] | 0.929 | 1.747 | 0.544 |

[1)] weight-% dry Exalt
[2)] W/C is the weight ratio of the water to cement in the fresh mortar
[3)] not measured

Example 10: Application as Repair Mortar

Component $A_3$ and component $B_3$, each separately, were mixed in a vacuum mixer for 20 minutes at 2000 rotations per minute under relative vacuum of 850 mbar to remove entrapped air. Next they were filled in a cartridge of 300 ml volume having two separate compartments with a volume ratio of 3 to 1. Component $A_3$ was filled in the larger compartment, component $B_3$ in the smaller one. The cartridge was connected to a static mixer with a nozzle of 8 mm diameter. The mortar was extruded by using a pneumatic gun.

A hollow in a wall out of concrete of about 10 mm diameter and 40 mm depth was filled with this mortar. After 1 hour a hole of about 5 mm diameter was drilled in that place and a screw with an anchor bolt was fixed and loaded with a weight of 5 kg for 24 hours without any cracking or damage.

Example 11: Application for 3D Printing

Component $A_3$ and component $B_3$, each separately, were mixed in a vacuum mixer for 20 minutes as described in example 10. A small amount of colouring agent was added to component $B_3$ prior to mixing. The components were filled in separate cartridges of 300 ml volume each. The cartridges were connected to a static mixer of 140 mm length with a nozzle of 3 mm diameter. The extrusion of the components was done by pneumatic pumps controlled by a computer. The mixing ratio of component $A_3$ to component $B_3$ was 3 to 1 by mass. The printing was performed by a robot. The mortar was used to print a cylinder with 20% inclination, 65 mm inner diameter and 100 mm height. The height of each layer was 1 mm, the printing speed was 500 mm/min. The structure was finished within 45 minutes. The surface was not smoothed and had an attractive wave-like structure and an almost homogeneous colour.

Example 12: Application for 3D Printing

Example 11 was repeated but the printing speed was 2,000 mm/min. The colour of the mortar was fully homogeneous and the structure was finished within about 11 minutes.

Example 13 and 14: Preparation of Mortars

The components A and B according to table 15 were mixed as described in example 2. The properties of the mortars are given in table 15.

TABLE 15

Composition and properties of fresh and hardened mortar system

| Example | 13 | 14 |
|---|---|---|
| Component A | $A_6$ | $A_7$ |
| Component B | $B_3$ | $B_3$ |
| Ratio A/B by weight | 3:1 | 3:1 |
| Cement in fresh mortar [weight-%] [1] | 7.5 | 16.5 |
| W/C [2] | 1.20 | 0.91 |
| Start setting [min] | 11 | 12 |
| Final set [min] | 17 | 18 |
| Compressive strength [MPa] | | |
| after 20 min. | <1 | <1 |
| after 30 min. | <1 | 1.1 |
| after 40 min. | <1 | 1.6 |
| after 1 hour | <1 | 2.9 |
| after 3 hours | 2.3 | 6.6 |
| after 8 hours | 5.3 | 8.2 |
| after 48 hours | 6.2 | n.m. [3] |

[1] weight-% dry Exalt
[2] W/C is the weight ratio of the water to cement in the fresh mortar
[3] not measured Example 15 to 18: Production of Mortars Component $A_8$ and component $B_6$ were mixed in the ratios given in table 16, with a mechanical mixer (KitchenAid Model ARTISAN, 5KSM150) for 1 minute at speed 4. The properties of the produced mortars are given in table 16.

TABLE 16

Composition and properties of fresh and hardened mortar system

| Example | 15 | 16 | 17 | 18 |
|---|---|---|---|---|
| Ratio A/B by weight | 1:1 | 3:1 | 5:1 | 7:1 |
| Cement in fresh mortar [weight-%] [1] | 8.9 | 13.3 | 14.8 | 15.5 |
| W/C [2] | 1.67 | 1.15 | 1.05 | 1.00 |
| Compressive strength [MPa] | | | | |
| after 10 min. | 2.6 | 2.8 | 3.2 | 3.3 |
| after 20 min. | 3.8 | 4.4 | 4.5 | 4.9 |
| after 30 min. | 4.5 | 5.5 | 5.4 | 6.4 |
| after 40 min. | 4.9 | 6.0 | 6.4 | 7.1 |
| after 1 hour | 5.4 | 6.8 | 7.6 | 7.7 |
| after 3 hours | 6.1 | 7.8 | 8.9 | 8.9 |

[1] weight-% dry Exalt
[2] W/C is the weight ratio of the water to cement in the fresh mortar Example 19: Preparation of Mortars The components $A_{10}$ and $B_7$ were mixed in the weight ratio of 3:1. The properties of the mortar are given in table 17.

TABLE 17

Composition and properties of the fresh and hardened mortar system

| Example | 19 |
|---|---|
| Cement in fresh mortar [weight-%] [1] | 13.4 |
| W/C [2] | 0.81 |
| Start setting [min] | 28 |
| Final set [min] | 50 |
| Compressive strength [MPa] | |
| after 1 hour | 2.0 |
| after 2 hours | 7.3 |
| after 3 hours | 8.6 |
| after 8 hours | 9.9 |

[1] weight-% dry Exalt
[2] W/C is the weight ratio of the water to cement in the fresh mortar Example 20: Application for 3D Printing Component $A_8$ and component $B_6$ were each filled separately in cartridges of 300 ml volume. The cartridges were connected to a 140 mm long static mixer with a nozzle of 2.5 mm diameter. The extrusion of the components was done by pneumatic pumps controlled by a computer. The mixing ratio of component $A_8$ to component $B_6$ was 1 to 1 by mass and the extrusion speed of the mortar was 30 g per minute. The printing was performed by a robot. The mortar was used to print a house-like structure with a square base of 100×100 mm and a height of the walls of 65 mm, topped by a roof in the form of a square pyramid. The "house" had a total height of 124 mm. The walls had a width of 10 mm and were printed in two parallel layers each of 5 mm width next to each other. Several layers were deposited on top of each other, with each layer with a height of 0.4 mm. The robot speed to print the walls was 10,000 mm per minute. For the roof, the mortar was applied in one horizontal layer with a width of about 5 mm with a robot speed of 5,000 mm per minute. The hardened structure kept the desired form with straight walls and non-sagging roof. The final structure had a homogeneous colouring and a slightly rough surface.

Reference Example 1: Production of a Mortar 1000 g of component $A_9$ and 20 g of reference component $B_8$ were mixed with a mechanical mixer (KitchenAid Model ARTISAN, 5KSM150). After mixing for about 5 minutes at speed 2 the mortar still had big lumps and the aspect was inhomogeneous. Further mixing didn't improve this result. The mortar had the properties given in table 18. This mortar was not suitable for use in 3D printing.

TABLE 18

Properties of the fresh and hardened mortar system

| Ratio $A_9/B_8$ by weight | 100:2 |
|---|---|
| Cement in fresh mortar [weight-%] [1] | 39.7 |
| W/C [2] | 0.69 |
| Start setting [min] | >45 |
| Compressive strength [MPa] | |
| after 20 min. | <1 |
| after 30 min. | <1 |
| after 40 min. | <1 |
| after 1 hour | <1 |
| after 3 hours | 3.5 |
| after 8 hours | 6.6 |

[1] weight-% dry Exalt
[2] W/C is the weight ratio of the water to cement in the fresh mortar

The invention claimed is:
1. A process for printing a 3D structure comprising the steps of providing a multi-component mortar system comprising a component A and a component B, wherein the component A comprises 10 to 50 weight-% aluminous cement and 30 to 78 weight-% mineral filler, based on the weight of component A, at least one set inhibitor, and water, and the component B comprises an initiator system for the set-inhibited aluminous cement, 65 to 86 weight-% mineral filler, based on the weight of component B, and water;

mixing the components with a static or dynamic mixer and applying the mixed mortar with a robotic system to form a 3D structure; and curing of the applied 3D structure.

2. The process for printing a 3D structure according to claim 1, wherein the component A is free of boric acid or a salt thereof.

3. The process for printing a 3D structure according to claim 1, wherein the component A comprises at least a phosphate-based set inhibitor.

4. The process for printing a 3D structure according to claim 1, wherein the initiator system in component B comprises an alkaline compound selected from the group consisting of alkali hydroxide, earth alkali hydroxide, earth alkali oxides, alkali oxides, alkali silicate, alkali aluminate, amines and mixtures thereof.

5. The process for printing a 3D structure according to claim 1, wherein the mineral filler is selected from materials of the group consisting of calcium carbonate, dolomite, titanium dioxide, silicon dioxide, fly ash, slag, river sand, sand from sediments and crushed stone and mixtures thereof.

6. The process for printing a 3D structure according to claim 1, wherein 85 weight-% of the particles of the mineral filler in the component A and the component B are smaller than 0.3 mm.

7. The process for printing a 3D structure according to claim 1, wherein the consistency of the component A and the component B, each separately, is paste-like with a plastic viscosity in the range of 20 to 2,000 Pa's measured with a plate-plate rheometer with plate diameter of 25 mm, 2 mm gap at a shear rate of $1\ s^{-1}$.

8. The process for printing a 3D structure according to claim 1, wherein the component A and the component B and further components, if present, are each packed in separate containers, stored, and mixed immediately before application to produce a fast setting mortar.

9. The process for printing a 3D structure according to claim 1, wherein the content of aluminous cement in the fresh mortar, calculated as non-hydrated aluminous cement, is from 5 to 45 weight-% based on the weight of the fresh mortar.

* * * * *